Sept. 11, 1945.   W. F. ALLER   2,384,520
SPRING GAUGING DEVICE
Filed April 17, 1944
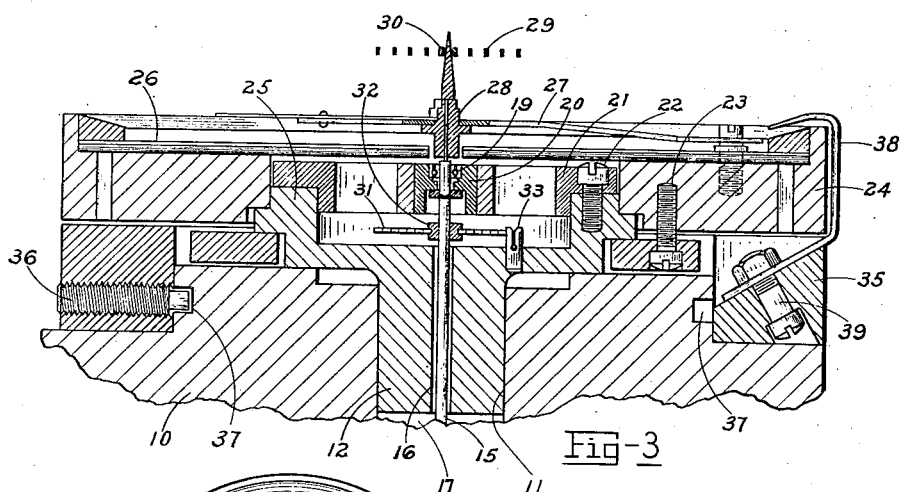
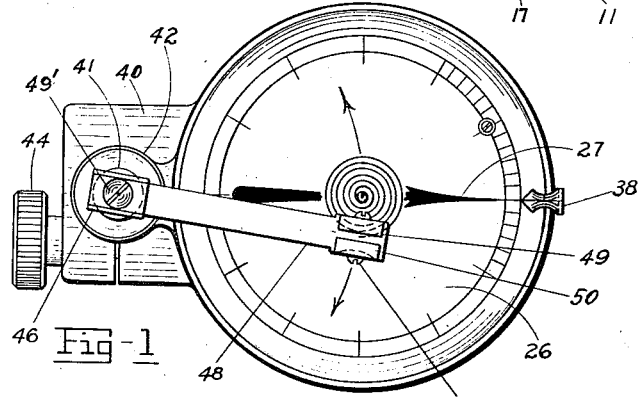
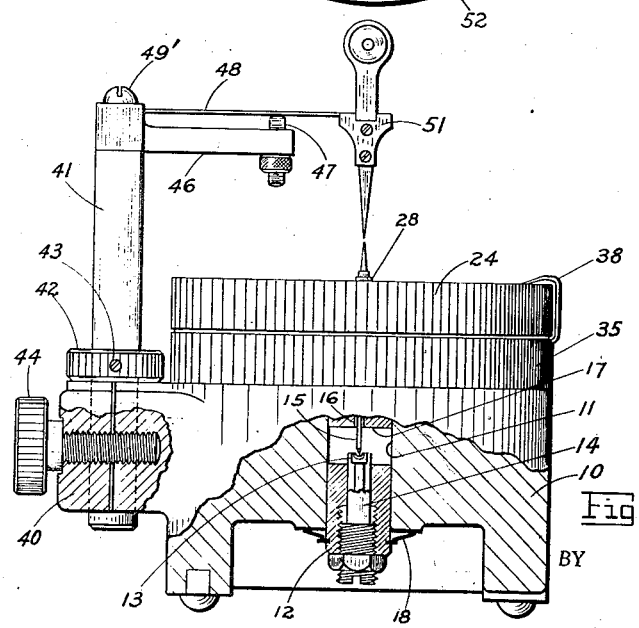
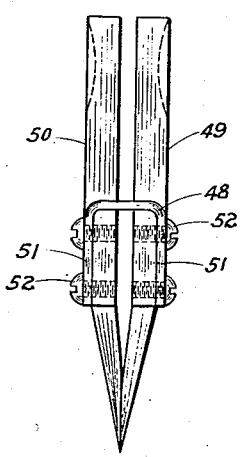
INVENTOR.
W. F. Aller
BY Edward J. Noé
ATTORNEY.

Patented Sept. 11, 1945

2,384,520

UNITED STATES PATENT OFFICE 2,384,520

SPRING GAUGING DEVICE

Willis Fay Aller, Dayton, Ohio, assignor to The Sheffield Corporation, Dayton, Ohio, a corporation of Ohio Application April 17, 1944, Serial No. 531,354

5 Claims. (Cl. 73—161)

This invention relates to gauging devices and more particularly to devices for gauging or comparing springs.

One object of the invention is the provision of a spring testing gauge which will compare a specimen spring with a master spring by balancing one against the other, the gauge having means, adapted for adjustment in an arcuate path intersecting the axis of the specimen spring, for conveniently grasping an end of the specimen spring.

Another object is the provision of a spring testing gauge having coacting arms, for grasping the end of a specimen spring, which are mounted on a spring blade and thus adapted for yielding movement towards and from the position of the specimen spring.

Another object is the provision of a spring testing gauge of the character mentioned, having a torsion spindle which is connected to one end of a master spring, the other end of which is fixed to an anchorage that is adjustable to vary the normal position of the spindle, the spindle providing for the support of one end of a specimen spring, with adjustably mounted tweezers for bodily movement in an arcuate path, for grasping and holding the other end of the specimen.

Other objects and advantages of the invention will be apparent from the following description, the appended claims and the accompanying drawing, in which Fig. 1 is a top plan view of a spring testing gauge embodying the present invention;

Fig. 2 is a side elevation of the gauge, shown partly in section;

Fig. 3 is a vertical central section through the upper part of the gauge; and

Fig. 4 is an end elevation of the tweezer arms.

Referring more particularly to the drawing, in which the same reference numerals have been applied to like parts in the several views, 10 designates a base or support, having a central passage 11. Rotatably mounted in the base is a shaft 12 which is retained against axial displacement by a spring washer 18. In the lower portion of this shaft there is a jewel bearing 13 carried by a threaded stud 14 which is adjustably carried in the shaft. The jewel bearing 13 supports the lower end of a torsion spindle 15 which extends upwardly through a passage 16 in the shaft. A transverse passage 17 in the shaft affords access to the jewel bearing.

The upper portion of the spindle 15 is mounted in a bearing 19 carried by a bearing collar 20 which is supported by a ring 21. The ring is secured by means of a screw or screws 22 to a head portion 25 on the shaft 12 and these parts are also connected by screws 23 to the adjustment ring 24. The outer surface of the adjustment ring is knurled or ridged as shown in Fig. 2 so it may be conveniently turned by the operator. It carries a dial or scale plate 26 having suitable graduations which cooperate with a pointer 27 the hub portion 28 of which is fixed to the spindle 15.

The upper end of the spindle is adapted to be secured to or carry one end of a specimen spring 29. In the construction shown, the upper end of the spindle is tapered so it may be received in the opening in the specimen spring collar 30 which is fixed to the inner end of a spring of helical form, thus anchoring one end of the spring helix to the spindle.

The spindle 15 is yieldingly connected to the head portion 25 and consequently to the adjustment ring 24 by means of a master spring 31, the inner end of which is secured to a hub or collar 32 which is held tightly on the spindle. The outer end of the master spring is held in a spring anchorage post 33 on the head portion. The master spring serves to yieldingly hold the spindle in a predetermined position, and by adjusting the position of the spring anchorage, as by rotating the adjustment ring 24, the spindle 15 is caused to rotate about its own axis.

Below the ring 24 is a second ring 35 rotatably supported on the base 10 and held against axial displacement along the base by means of a threaded stud 36 the inner end of which projects into an annular groove 37 in the base. At one side of this ring 35 is an index arm 38, held in place on the ring by a stud 39. This arm 38 projects upwardly and overturns the upper ring 24, the end of the arm being positioned adjacent the scale 26. The extent to which the scale is rotated when the ring 24 is turned can thus be readily determined by noting the readings on the scale with reference to the index arm 38. The ring 24 can thus be readily turned through exactly one-half of a revolution or through a full revolution or to any other desired extent.

The base 10 has a boss 40 in which the lower end of a vertical post 41 is carried. Post 41 is vertically adjustable in the boss 40 by loosening the positioning collar 42 held by set screw 43. The boss 40 is split at one side, as shown in Fig. 1, and the split portions are clamped together by a thumb screw 44 so as to secure the post 41 in adjusted position. By loosening the thumb screw 44 the post 41 can be turned about its own axis.

At the upper end of the post 41 is a rigid arm 46 having an adjustable abutment screw 47 arranged to contact to the lower side of a spring blade 48. One end of this spring blade is secured by screw 49' to the upper end of the post 41. The blade 48 projects over the specimen spring position, and at its outer end it carries a tweezer assembly shown in Fig. 4. This assembly is comprised of a pair of rigid arms 49 and 50, spaced apart at their upper portions, with their lower portions held yieldingly in contact with one another by the end portion of the spring blade 48. The spring blade at this portion is down-turned as indicated at 51, the down-turned portions being fixed by screws 52 to the respective arms 49 and 50. When the upper portions of these arms are squeezed together between the fingers, the lower ends are separated and will then grasp and hold the end of the specimen spring when the upper ends of the arms are released. By vertically adjusting the position of the post 41, the lower ends of the arms 49 and 50 may be arranged in the proper position to take hold of the specimen spring mounted on the upper end of the spindle 15. Normally, the lower ends of these two arms will be positioned somewhat below the level of the specimen spring so that the operator, when he grasps the upper ends of the two arms, can pull them upwardly against the action of the spring 48, thus lifting them clear of the specimen spring, and then lowering them in spread position so that the lower ends of the arm straddle the outer turn of the specimen. Then, as the operator releases the arms, they will grasp the end of the specimen without substantially disturbing or lifting the grasped portion.

The length of the blade 48 is such that the tweezer assembly is carried for adjustment in an arcuate path which intersects the axis of the spindle 15, and by rotatably adjusting the post 41, the tweezer assembly can be centered over the outer turn of the specimen spring, irrespective of the diametrical measurement of the specimen.

The operation of the device is as follows. The specimen spring having been applied and grasped by the tweezer assembly, the position of the scale with reference to the arm 38 is noted, the zero marking on the dial preferably having been placed adjacent this arm 38 for convenience before the specimen spring is grasped. Under these conditions there is no torsional strain on either the master spring 31 or the specimen spring 29, but both of these springs are anchored to the spindle 15. Then the operator turns ring 24 to apply tension to the master spring and from it to the specimen spring, this action also rotating the dial 26. As the dial is rotated to a predetermined extent, preferably one-half turn or one full turn, the position of the pointer 27 changes, the pointer moving of course with the spindle. If the torsional strength of the specimen spring is the same as that of the master, the rotational movements of the pointer will be one-half as such as the rotational movement imparted to the dial, and this may be corroborated by noting the position of the pointer with reference to the dial reading opposite the end of the pointer. If the specimen spring is stronger or weaker than the master, that fact will be indicated by comparing the reading of the scale or dial with respect to the arm 38, with the reading obtained by the pointer with respect to the dial.

While the form of apparatus herein described constitutes a preferred embodiment of the invention, it is to be understood that the invention is not limited to the precise form herein described, and that changes may be made therein without departing from the scope of the invention which is defined in the appended claims.

What is claimed is:

1. A spring testing gauge comprising a support, a torsion spindle rotatably mounted in said support and adapted for attachment to an end of a specimen spring, spring means yieldingly holding said spindle in a predetermined position, an anchorage rotatably carried by said support and connected to one end of said spring means, a pointer on said spindle, a scale cooperating with said pointer, spring arms for seizing an end of the specimen spring, and means for pivotally supporting said spring arms for bodily movement in an arcuate path intersecting the axis of said spindle.

2. In a spring testing gauge having a support and a torsion spindle rotatably mounted in said support and adapted for attachment to an end of a specimen spring, a spring anchorage adjustably mounted on said support, a control spring connected at one end to said anchorage and at its other end to said spindle, a post carried by said support, a spring blade carried at one end thereof by said post and projecting over the specimen spring position, an abutment carried by said post and engaging one side of said spring blade, and a pair of arms carried by said spring blade adjacent the specimen spring position and operable to seize an end of the specimen spring.

3. In a spring testing gauge, in combination, a support, a spindle rotatable in said support and adapted for attachment to an end of a specimen spring, means yieldingly holding said spindle in a predetermined position, means for adjusting the normal position of said spindle, a post axially adjustable in said support, a spring blade carried at one end by said post and projecting over the specimen spring position, a pair of arms each having a yielding connection to said spring blade and arranged adjacent the specimen spring position, said arms each having a finger portion operable to spread the ends of said arms, said finger portions, when released, permitting the ends of the arms to seize an end of the specimen spring.

4. In a spring testing gauge, in combination, a support, a torsion spindle rotatably mounted in said support and adapted for attachment to an end of a specimen spring, spring means yieldingly holding said spindle in a predetermined position, means operable to adjust said spring means to vary the position of said spindle, a pointer on said spindle and a scale cooperating with said pointer, a post carried by said support, a spring blade carried by said post and projecting over the specimen spring position, and a pair of arms projecting towards the specimen spring position and carried by the free end of said spring blade and operable to seize an end of a specimen spring.

5. In a spring testing gauge, in combination, a support, a torsion spindle rotatably mounted in said support and adapted for attachment to an end of a specimen spring, spring means yieldingly holding said spindle in a predetermined position, means operable to adjust said spring means to vary the position of said spindle, a pointer on said spindle and a scale cooperating with said pointer, a post carried by said support, a spring blade carried by said post and projecting over the specimen spring position, a pair of arms projecting towards the specimen spring position and carried by the free end of said spring blade and operable to seize an end of a specimen spring, and means providing for the adjustment of said post about its own axis to provide for movement of said arms in an arcuate path intersecting the axis of said spindle.

WILLIS FAY ALLER.